2,962,488

REMOVAL OF CATALYST FROM OLEFIN POLYMER BY TREATMENT WITH ALCOHOL UNDER INERT ATMOSPHERE

Samuel E. Horne, Jr., Akron, Ohio, assignor to Goodrich-Gulf Chemical, Inc., Pittsburgh, Pa., a corporation of Delaware No Drawing. Filed Dec. 27, 1955, Ser. No. 555,256

6 Claims. (Cl. 260—94.7)

The present invention relates to the treatment of, or recovery of, polymerized olefin hydrocarbon polymers in a usable form. More particularly, the invention relates to the recovery in a stable, non-corrosive form of olefin hydrocarbon polymers from reaction mixtures prepared by polymerization in solution in contact with heavy metal organometallic catalysts.

Olefinic hydrocarbons such as ethylene, isoprene, butadiene, etc. have been polymerized in an organic solvent in the absence of oxygen and in contact with heavy metal organometallic catalysts such as those produced by the reaction of an aluminum alkyl with a heavy metal compound such as titanium tetrachloride. The polymerization reaction mixture resulting from such a process contains the polymer either dissolved in or suspended in the solvent and catalyst residues either dissolved in or suspended in the mixture, or dispersed in or coated on the polymer particles. When the polymer is separated from such a medium, the catalyst residues tenaciously cling to the polymer particles rendering the polymer easily discolored and unstable when heated, corroding extruders, mills, molds and other handling equipment, interfering with curing operations (if polymer is unsaturated or contains other curable groups) and rendering the polymer unsatisfactory for electrical applications. Generally the catalyst, even in the freshly-prepared condition, is highly colored and in many cases contains a highly-colored or blackish precipitate which becomes intimately associated with, or dispersed in, the polymer as the latter forms. The presence in the polymer of these deleterious catalyst residues may in many instances pass unnoticed because the polymers are usually recovered with a beautiful white color. In many instances also it has been noted that severe polymer degradation occurs upon storage for short periods of polymer solutions containing active catalyst residues.

In accordance with the present invention, however, it has been discovered that the residues of the heavy metal organometallic catalysts in the polymerization reaction mixtures are, on first contact with oxygen, rapidly and almost instantaneously converted or oxidized to insoluble, substantially colorless products believed to comprise, in part at least, metal oxides or other complex oxidized products of the heavy metals. Such oxidized, insoluble catalyst residues precipitate on the polymer and are most difficult to remove. In the method of this invention, however, it has been found that if the reaction mixture, which has been prepared in the absence of oxygen, is treated with an alcohol in an inert, oxygen-free, water-free atmosphere, the polymerization reaction and other side reactions are abruptly terminated and the catalyst residues are converted to an inactive, more soluble form in which they are more readily removed from the polymer. After treatment with alcohol the catalyst residues are not as readily oxidized and the subsequent handling of the reaction mixture and the recovered polymer may be performed in air. When the reaction mixture is exposed to the effects of the atmosphere before addition of the alcohol, however, polymers of high ash content, poor stability and poor molded color, poor electricals, and sometimes much lower molecular weight are obtained, irrespective of the subsequent extractive and/or other treatments given the polymer.

In the method of this invention the polymerization reaction mixture may contain any polymer derived from olefinically-unsaturated hydrocarbon monomers which are polymerized in contact with the heavy metal organometallic catalysts to be more fully described below. Thus, the reaction mixture may be derived from a monomeric material containing a significant proportion of a monoolefinic hydrocarbon such as ethylene, propylene, butene-1, butene-2, isobutylene, 1-pentene, 1-hexene, 1-octene, 1-decene, cyclohexene, methyl cyclohexene, cycloheptene, aryl-substituted monoolefins such as styrene, vinyl naphthalene, alpha-methyl styrene, o-, m- and p-methyl styrenes, dimethyl styrenes, indene, allyl benzene, allyl toluene, stilbene, and others, and from mixtures of 1 or more of such monoolefinic hydrocarbons with or without other copolymerizable monomeric materials. The polymer may also be derived from the polymerization of monomeric materials containing a significant proportion of a polyolefinic hydrocarbon including a conjugated diolefin such as the conjugated dienes including butadiene-1,3, the methyl butadienes sush as isoprene or piperylene, the conjugated polyolefins containing more than five carbon atoms such as 2,3-dimethyl-butadiene-1,3; 2-ethyl-butadiene-1,3; 4-methyl-pentadiene-1,3; 2-ethyl-pentadiene-1,3; hexadiene-2,4; hexatriene-1,3,5; 4-methyl-hexadiene-1,3; 2,4-dimethyl-pentadiene-1,3; 2-isopropyl-butadiene-1,3; 1,1,3-trimethyl-butadiene-1,3; octatriene-2,4,6; octadiene-2,4; 1,1-dimethyl-3-tertiary-butyl-butadiene-1,3; 2-neopentyl-butadiene-1,3; myrcene; alloocimene or the like; the conjugated alicyclic polyolefinic hydrocarbons such as cyclopentadiene; cyclohexadiene-1,3; cycloheptadiene-1,3; dimethyl fulvene and others; or an aryl-substituted diolefin hydrocarbon such as phenyl-butadiene-1,3; 2,3-diphenyl-butadiene-1,3; diphenyl fulvene and others; and mixtures of any two, three or more of such monoolefins and/or polyolefins with or without non-conjugated polyolefins such as allene, diallyl, dimethallyl, propyl allene, squalene, 1-vinyl-cyclohexene-3, divinyl benzene, and others.

The above and other monomers are converted to novel polymers by the heavy metal organometallic catalysts including high melting, rigid and hard, and highly crystalline forms of polyethylene or polystyrene; to novel ethylene-propylene copolymers; to synthetic head-to-tail, all cis-1,4 polyisoprene; synthetic trans-1,4 polyisoprene; and others. The novel polyisoprene polymers are more fully described in U.S. application, Serial No. 472,786, filed December 2, 1954, and the all-trans-1,4 polyisoprenes are more fully described in U.S. Serial No. 503,-027, filed April 21, 1955. Still other polyolefin hydrocarbon polymers prepared with these heavy metal catalysts are described in U.S. Serial No. 503,028, filed April 21, 1955.

The heavy metal organometallic catalysts which may be employed to produce a polymerization reaction mixture susceptible to treatment by the method of this invention are made up of metal atoms connected to radicals capable of joining of metal atoms in organometallic compounds, at least one of such radicals being an organic radical connected to a metal atom through a carbon atom, and at least one of the metal atoms being a heavy metal occurring in the 4th to 10th positions of the long periods of the periodic table (as shown on page 342, Handbook of Chemistry and Physics, 33rd edition, published by Chemical Rubber Publishing Co., Cleveland, Ohio, 1952). In this definition of the catalyst the term "radicals capable of joining to metal atoms in organometallic compounds" includes (1) organic radicals capable of linking to metal through carbon such as alkyl radicals, aryl radicals, cycloalkyl radicals, and other hydrocarbon radicals, all of which are sometimes designated "R" herein, (2) oxy-hydrocarbon radicals such as alkoxy radicals, aroxy radicals, etc., (3) organic salt-forming radicals such as the acetate radical, the oxalate radical, the acetyl-acetone radical, etc., (4) inorganic salt-forming radicals such as the halogen atoms (that is, fluorine, chlorine, bromine, and iodine atoms) as well as oxyhalide radicals, nitrate radicals, sulfate radicals, etc. and (5) hydrogen atoms, all such radicals (1) to (5) being sometimes hereinafter referred to as "X." The term "heavy metal occurring in the 4th to 10th position of the long periods of the periodic table" includes the metals of groups IVB, VB, VIB, VIIB, and VIII including titanium, zirconium, hafnium, vanadium, niobium (columbium), tantalum, chromium, molybdenum, tungsten, manganese, technetium, rhenium, iron, cobalt, nickel, ruthenium, rhodium, palladium, osmium, irridium and platinum as well as metals in corresponding positions in the last long period in the so-called "actinium series" such as thorium and uranium.

The above definition of catalysts which are inactivated and removed by the method of this invention includes catalysts which are made up of a single organometallic compound having as its metallic portion a heavy metal atom of the group set forth, which heavy metal atom is connected by at least one of is valences to a carbon atom of an organic radical, and it also includes catalysts made by bringing together a plurality of chemical compounds, one of which may be an organometallic compound in which a carbon atom of an organic group is attached to a metal atom other than a heavy metal atom of the group set forth, for example, an alkali metal (such as sodium, potassium or lithium) or an alkaline earth metal (such as barium, calcium, or strontium) or magnesium, or aluminum, or zinc, or a rare earth metal, or tin, or lead, or some other metal, and another of which may be a simple compound such as a salt of a heavy metal of the group set forth, the two types of metal compounds each having the metal atoms connected only to radicals of the type set forth above. There is also included catalysts formed by reacting the heavy metal in activated form with an olefinic compound (which may be the same as that later polymerized) which provides the organic radical linked by carbon to the heavy metal atom.

Catalysts which are a single chemical compound include those compounds of the formula $R_a$—$M_H$—$(X)_b$ wherein $M_H$ is a heavy metal of the class set forth, R and X have the significance set forth and $a$ and $b$ are integers totaling the valence H of $M_H$. Catalysts which are made up of, or by reacting, a combination of chemical compounds, which are generally preferred because of the instability and difficulty of preparation of compounds of the $R_a$—$M_H$—$(X)_b$ type, include the following combinations:

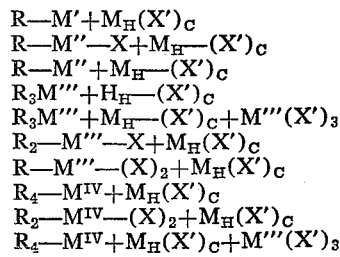

wherein M′ represents a monovalent metal such as sodium or lithium; M″ represents a bivalent metal such as barium or calcium; M‴ represents a trivalent metal such as aluminum; $M^{IV}$ represents a tetravalent metal such as tin; $M_H$, R and X represent the same as above, X′ represents a salt-forming (X) radical and C represents the maximum valence of $M_H$. Preferred catalysts of all the above types are those wherein:

R is an alkyl radical such as methyl, ethyl propyl, butyl, isobutyl, amyl, hexyl, octyl, dodecyl etc., or a substituted alkyl such as phenylethyl, or an aryl radical such as phenyl, $M_H$ is titanium, zirconium, thorium, or uranium, most preferably titanium, X is hydrogen, halogen or oxhalide, preferably halide X′ is halogen, preferably chlorine, M′ is alkali metal, preferably sodium or potassium, M″ is an alkaline earth metal, or magnesium, or zinc, preferably magnesium, M‴ is aluminum or boron, gallium, indium or thallium, preferably aluminum, and $M^{IV}$ is tin or lead, preferably tin.

The preferred catalysts, both because of their greater activity and their ability to direct the course of polymerization toward 1,4-addition (for the conjugated dienes) and their ability to produce straight-chain, high-molecular weight and crystalline ethylene and styrene polymers, are those prepared by reacting in an inert hydrocarbon solvent, and in the absence of oxygen, water, and other active hydrogen containing materials, an alkyl aluminum compound of the types $R_3Al$, $R_2Al$—X or R—Al—$X_2$ with a titanium tetrahalide such as $TiCl_4$, with or without an aluminum halide of the types $AlX_3$, R—Al—$X_2$ or $R_2$—Al—X. When these compounds are brought together in solution, a reaction occurs to produce the catalyst, in most cases the reaction being evidenced by the liberation of heat and the formation of color and/or a precipitate. In preparing the alkyl aluminum titanium tetrahalide catalysts the reactants are brought together at any desired temperature, preferably room temperature, in the absence of free oxygen and water, preferably in the absence of any materials other than the metal compounds and hydrocarbon materials, and particularly in the absence of significant amounts of active hydrogen containing compounds such as alcohols, amines, acids, etc., oxygen-yielding compounds such as peroxides and other types of such compounds such as ethers, esters, ketones, sulfides, etc. The reaction is best brought about by adding the metal components to an inert hydrocarbon solvent or diluent such as a saturated alkane, among which are butane, hexane, heptane, octane, cetane, or the like, or mixtures thereof, such as Deo-Base kerosine, diesel oil, or the mixture of alkanes resulting from the Fischer-Tropsch process or a cycloalkane such as cyclohexane or methyl cyclohexane or a benzene hydrocarbon such as benzene, toluene or xylene. It is important that the solvent be free of oxygen and water, and preferably that it also be free from peroxides, bivalent sulfur compounds, and various other impurities which can poison, decompose, or inactivate the various ingredients or interfere with the catalyst-forming reaction.

The reaction between the preferred alkyl aluminum compounds and a titanium compound, preferably titanium tetrachloride, may be carried out, for example, by adding triethyl aluminum, triisobutyl aluminum, or trioctyl aluminum to purified heptane at room temperature followed by addition of the titanium tetrachloride (in absence of oxygen, water, etc.). Reaction usually occurs with the formation of a dark, sometimes black, and difficultly-soluble material. If the trialkyl aluminum heptane solution is first saturated with ethylene, isobutylene, etc. before the titanium tetrachloride is added, the formation of the precipitate is usually avoided and a catalyst containing no visible precipitate is obtained. When a dialkyl aluminum halide, alkoxide, or other compound of the structure ($R_2$—Al—X) is employed, soluble catalysts usually result. Those polymers prepared in contact with the soluble catalysts usually are more easily recovered from the reaction mixture in a pure, more staple and color-free form, probably because there is less of the colored material or sparingly soluble catalyst precipitate to remove from the polymer.

The above-described heavy metal catalysts usually are employed to polymerize the hydrocarbon monomers by forming a solution or suspension of the catalyst in an inert hydrocarbon solvent and then mixing it with monomeric material while the reaction mixture is cooled to maintain the temperature below about 250° C. (down to −100° C.) and preferably at temperatures between about 5 and about 100° C. and most preferably between 5 and 60° C. Free oxygen, water and active hydrogen containing materials, sulfur, and other catalyst poisons should be carefully excluded from the mixture during polymerization by using carefully purified and dried monomers and solvents and maintaining an inert atmosphere such as nitrogen, argon, helium, hydrocarbon vapors, and the like, over the reaction mixture. The pressure obtaining during the reaction is not critical, pressures above or below atmospheric pressure or those due to the effects of the monomers and solvents alone being satisfactory since the process is inherently a low pressure process. Preferably the gaseous monomers such as ethylene or propylene are introduced in gaseous form below the surface of the catalyst-solvent mixture and the higher boiling monomers such as butadiene, isoprene, styrene, etc., being introduced in liquid form while maintaining an inert atmosphere over the reaction mixture. Under these conditions the monomeric hydrocarbon polymerizes forming either a solution or dispersion (slurry), or both, of polymer in the solvent (depending on the choice of monomer and solvent and, in some cases, on the molecular weight of the polymer). If a polymer solution is formed, an increase in viscosity is readily apparent. If the polymer precipitates out of the solvent as a slurry, the reaction may be carried to higher total solids content before the reaction mixture becomes too viscous to stir and remove the heat of reaction. The reaction is rapid, being complete in as little as 30 minutes to as much as 10 or 20 hours, the time of reaction being capable of variance depending on the monomers and their purity, the total catalyst concentration and ratio, temperature and other polymerization conditions.

The relative proportions of hydrocarbon solvent, catalyst and monomeric hydrocarbon employed in the above-described polymerization process may be varied considerably. It is ordinarily desirable to use an amount of solvent in excess of the monomeric hydrocarbon, usually between about 1 and about 30 times the volume of the monomer, and preferably between about 8 and about 20 times the monomer charge. In the polymerization of ethylene the ratio of solvent:monomer may even be higher than this. The amount of catalyst likewise can be varied widely depending on the catalyst itself, on the monomer, and on the purity of all ingredients present. Usually, however, from 0.5 to 20 percent by weight, based on weight of a monomer such as butadiene-1,3 or isoprene, 1.5 to 20 percent for other diene-type monomers, and for polyethylene even smaller amounts, for example, 1 to 3 millimoles per liter of solvent. Where the preferred alkyl aluminum titanium catalysts are employed, the molar ratio of titanium tetrachloride:alkyl aluminum may be varied from as high as 3:1 to as low as 1:10, or lower, depending on the choice of monomer system, solvent, etc. For directive polymerization of isoprene, for example, to form all-cis-1,4 type polymer, the molar ratio should be at or near 1:1. For the preparation of all trans-1,4 polybutadiene the molar ratio should be at or near 2:1. For polyethylene the ratio may be varied more widely, depending on the molecular weight desired in the polymer, for example, from 3:1 to 1:10.

The solvent effect of the solvent on the polymer, and to some extent the catalyst itself, will determine the proportion of polymer in the final reaction mixture. For example, with heptane or benzene in the polymerization of isoprene, a solution of polymer is obtained while with butane a slurry is obtained. Polyethylene is obtained as a slurry in most hydrocarbon solvents. The polymer solutions become viscous at about 10 percent or slightly higher solids content while with a slurry-like product up to 40 percent or more solids can sometimes be obtained. Irrespective of the type of reaction mixture (solution or slurry), however, the alcohol shortstop of this invention is equally effective. Where polymer is obtained in solid form, alcohols will more effectively wet the polymer than when many other extractive liquids are employed. With some mono-olefinic hydrocarbon polymers it has been noted that catalyst residues in the reaction mixture are more easily remove if the polymerization has been carried to a high yield per unit of solvent. This effect may be due to depletion of the catalyst or dilution of the catalyst residues.

In accordance with this invention the above-described polymerization reaction mixture containing heavy metal organometallic catalyst residues, while carefully excluding oxygen, water, etc., is mixed with a quantity of an alcohol, or alcohol is added to the reaction mixture, in order to inactivate and solubilize the catalyst residues. Sufficient alcohol should be employed to react with or inactivate all of the catalyst and its residues remaining in the reaction mixture. Since the total concentration of catalyst is usually of the order of 1 or 2 to 100 millimoles per liter of solvent, proportions of alcohol amounting to only 1 to 10 percent by volume of the reaction mixture are usually fully effective to inactivate the catalyst. In some instances as little as 2 to 20 ml. per liter of reaction mixture appears as effective or more effective as much larger amounts. More may be employed, and in some cases larger amounts are advantageous because they bring about a precipitation of polymer-solvent solutions. For the latter use up to an equal volume, or even up to 5 or 10 times or more the volume of the reaction mixture can be employed. Solvent recovery problems in the usual case, however, dictate that the smallest amount of alcohol be employed consistent with effective catalyst inactivation.

Following the intermixture with alcohol the reaction mixture preferably is mixed for a time to distribute the alcohol through the charge to allow reaction with the catalyst to occur. Depending on the alcohol and solvent combination employed, and on the type of polymer, subsequent treatment and handling of the polymer may vary considerably. The "shortstop" alcohol usually dissolves out between 50 and 95 percent of the catalyst residues. The remainder can be extracted in various ways. For example, polyethylene in high molecular weights usually is obtained as a slurry in most solvents. Polyethylene slurries of this type are easily treated with an alcohol irrespective of the miscibility of the alcohol and solvent because of the good wetting quality of the alcohol. With unsaturated polymers such as polyisoprene or polybutadiene in solution form in an alcohol-miscible solvent such as benzene, however, serious polymer degradation occurs unless the amount of alcohol, or of another non-solvent, is sufficient to precipitate the polymer out of the miscible alcohol-benzene mixture shortly after addition of alcohol. In this case even the alcohol-inactivated catalyst residues (no longer capable of polymerization) appear to have the power to degrade the product. When thrown out of solution as a slurry or crumb simultaneously with, or soon after, the addition of the alcohol, degradation of the polymer is greatly reduced.

Likewise, where the alcohol and the solvent are not miscible, vigorous agitation is required to insure good contact, effective catalyst inactivation and effective catalyst extraction. Where immiscibility occurs, the inactivated reaction mixture separates on standing into separate solvent and alcohol layers greatly simplifying solvent recovery and subsequent polymer handling operations. The separate solvent layer contains the polymer in either dissolved or suspended form, and, as such, can be washed with more alcohol, with water, with acetone or other material capable of extracting the solubilized catalyst-alcohol residues. In this instance also the alcohol layer will be found to contain 50 to 95 percent or more of the catalyst and most of the remainder (in the solvent or on the polymer) is easily washed out or extracted. The polymer may then be separated from the solvent by precipitation (if dissolved), by filtering (if slurried), by evaporation (solution or slurry), by steam, alcohol vapor or solvent vapor distillation (solution or slurry), by wash milling the polymer with warm or hot water, or by other techniques. Finally, the polymer is dried to remove the last traces of solvent and/or moisture. The resulting dried polymer is usually light in color, does not change appreciably in color on extended exposure to light and heat, and has other vastly improved properties as compared to polymers treated with alcohol after contact with air, water, etc., or in the presence of any other substances capable of insolubilizing the catalyst or its residues.

Likewise, when working with polymer slurries in an alcohol immiscible solvent, and after separation of the shortstop alcohol, the slurry may be filtered to remove the solvent and the filter cake washed a second or third time with alcohol, water, aqueous alcohol, acetone, methyl ethyl ketone or other solvent for the catalyst. Two or three washing cycles are usually sufficient to remove most of the remaining catalyst from the polymer. For example, the filter cake can be slurried in alcohol or alcohol-water or alcohol-solvent mixtures and the slurry passed through a grinding mill to ensure efficient extraction, or added along with extractive solvents and diluents to an internal type mixer. The filter cake can also be washed as such. If desired, an alternative procedure is to wash or extract the solvent slurry with water or acetone and then filter, although such an order of steps leads to wet or contaminated solvent which must be purified before reuse. In any of these procedures the ash content of the polymer usually can be reduced below about 0.2 percent and usually to 0.05 percent or below.

When a polymer solution in an alcohol-miscible solvent is being shortstopped, it is usually desirable to employ a sufficient quantity of alcohol and/or of a suitable non-solvent or diluent, for example, from about equal volumes to 4 or 5 times the volume of the reaction mixture, to throw the polymer out of solution. Once the polymer is precipitated any of the procedures outlined above for slurries can be followed in finishing up the polymer.

For separating the polymer from the solvent or solvent-alcohol mixtures, centrifuging, filtering, decanting, or any other means may be employed. Removal of residual solvent from the filtered polymer crumb is conveniently carried out by steam distillation, alcohol vapor distillation, wash milling with warm (50–100° C.) water and the like. Drying of the polymer can be carried out in air in ovens, in vacuum ovens, tunnel driers, high frequency ovens, under infrared radiation or on a hot mill, internal mixer, dewatering extruder, Banbury, or other equipment. It is sometimes desirable to pass the freshly separated and extracted polymer crumb through squeeze rolls to reduce its solvent and/or water content and convert it to a thin chip-like or sheet form in which it is more efficiently dried. If desired, the dry polymer can be mill massed and sheeted, pelletized or extruded, and powdered or granulated, with or without added stabilizers, age-resistors, fillers, pigments, tinting agents and other compounding ingredients in order to produce a final dry product best suited for its end use.

Any alcohol or alcoholic —(OH) containing material may be employed as the quenching or inactivating agent. Methanol is about as effective as any other material, it is inexpensive, and it is easily separated from most of the hydrocarbon solvents. Other materials which may be employed include ethanol, propanol, isopropanol, n-butanol, isobutanol, the pentanols, the hexanols, the heptanols, the octanols, ether alcohols, ethoxyethanol and related alkoxyalcohols benzyl alcohol, polyhydroxy compounds such as the glycols, preferably the water-soluble ethylene and polyethylene glycols, glycerine, etc.; and hydroxy aromatic compounds such as phenol and others. In many cases the shortstopping agent will be selected for its miscibility or immiscibility with the hydrocarbon solvent, or for its distillation characteristics in mixtures with the solvent, in order to simplify solvent recovery.

The alcoholic shortstopping agent of this invention may also contain other additives which will assist in neutralizing and/or complexing acidic substances liberated by alcoholysis of the catalyst. For example, small proportions of sodium hydroxide, potassium hydroxide, strong amines, ammonium hydroxide (or anhydrous ammonia), sodium carbonate and the like can be added to the alcohol to neutralize the hydrohalogen acid liberated upon alcoholysis of titanium halide containing catalysts. Acids may be added, if desired, to solubilize the dark colored precipitate. Likewise, where it may be desirable to oxidize, or partially oxidize, the catalyst residue, small proportions of oxidizing agents such as hydrogen peroxide, $KMnO_4$, and the like can be added to the alcohol. With the unsaturated polymers of polyolefinic monomers it usually is desirable to introduce antioxidants as soon as possible, this being most conveniently accomplished by adding such materials to the shortstop alcohols. Still other substances can be employed in this manner including dispersing agents, peptizing agents, processing aids, extender oils, and many others.

The invention will now be described more fully with reference to several specific examples which illustrate the invention as applied to several different types of olefin hydrocarbon polymers and the various working procedures and techniques which may be employed. These examples are intended, therefore, to be illustrative only.

*Example I*

In this example, all-cis-1,4 polyisoprene having the structure of and many properties equal to or superior to natural rubber is prepared by the polymerization of highly purified isoprene. 200 parts of dry, deaerated heptane, 4.03 parts (11 millimoles) of anhydrous, distilled tri-n-octyl aluminum and 2.085 parts (11 millimoles) of anhudrous titanium tetrachloride are combined at room temperature in a reaction vessel equipped with a closed condenser and in which a dry, nitrogen ($O_2$-free) atmosphere is maintained. On the addition of the titanium tetrachloride the solution becomes warm and assumes a dark color. This catalyst solution is aged for about 30 minutes at room temperature and then diluted so as to contain a total of 1000 parts by volume of the deaerated heptane.

The catalyst solution prepared above is carefully protected during handling and aging by a blanket of dry, $O_2$-free nitrogen or other inert gas. While maintaining the nitrogen atmosphere, 68 parts by weight (104 parts by volume) of liquid monomeric isoprene of high purity (distilled and dried) are introduced by injection and the vessel contents are agitated by stirring. The rate of isoprene injection is carefully controlled so that the temperature of the mixture is maintained at or about 45 to 50° C. About 45 minutes are required to add all of the isoprene. Some time after the addition of isoprene has commenced, reaction is evidenced by increase in viscosity and condensation of isoprene and solvent vapors in the condenser, the condensate being returned to the pot. The pressure obtained is substantially that due to the isoprene-solvent vapors at the temperatures existing in the pot.

After the addition of isoprene has been completed, stirring of the contents of the vessel is continued for an additional period of about 2 hours. The viscosity of the reaction mixture continues to increase during the two hour stirring period indicating continued polymerization. The product is a very dark solution or cement of rubbery polymer in heptane.

The reaction mixtures resulting from the above-described polymerization mixtures is then blown by means of nitrogen pressure into a closed vessel equipped with a stirrer and containing about an equal volume of methanol (acidified with HCl) maintained under a dry, $O_2$-free nitrogen atmosphere. The contents of the vessel are then vigorously agitated for a few minutes and then let stand. The contents of the vessel separate into distinct layers of (1) an upper, light-colored heptane solution of polymer saturated with methanol and (2) a lower dark-colored methanol layer saturated with heptane. The heptane layer is decolorized while the methanol layer is highly discolored indicating the dark color derived from the catalyst has been efficiently extracted from the heptane. The layers are separated, the methanol layer being withdrawn and set aside for purification and the heptane layer is left in the vessel. At this point the shortstop vessel may be opened to the atmosphere, if desired. A sufficient quantity of acetone containing 0.7 part by weight of phenyl-beta-naphthylamine antioxidant is then added with stirring to cause separation of the polymer as a slurry. The slurry is then filtered in air and the heptane-acetone filtrate set aside for separation and purification. The filter cake is then washed with several portions of water (about 1000 parts by volume each) until acid-free. The filter cake is then sucked dry and placed in an air oven to dry. The dry polymer (55 parts or 81 percent yield based on the weight of isoprene) is then sheeted out on a rubber mill to form rubbery sheets having a tackiness equivalent to that of high grade natural rubber. No corrosion of the mill is noted. The ash content of the dried polymer is very low and the color of the sheet is nearly white. When the milled sheets are compounded in a natural rubber "pure gum" recipe and then vulcanized 40 minutes at 280° C., a "snappy" vulcanizate is obtained which is 4 to 5 times stronger than a "GR–S" control and which compares favorably with similar vulcanizates of good grades of natural rubber. Since the vulcanization proceeded in a normal manner, it can be concluded that the catalyst residues are effectively neutralized and extracted by the above procedure. When, however, a portion of the above reaction mixture is exposed to air during the addition of the methanol shortstop (subsequent treatments otherwise the same), a tougher, much more highly gelled and less desirable polymer is obtained which vulcanizes but with obtainment of much poorer properties. Intrinsic viscosity measurements (in toluene) indicate a lower molecular weight for the polymer shortstopped in air as compared to that shortstopped under nitrogen.

*Example II*

In this example a benzene solution of trans-1,4 polybutadiene is treated to recover a high quality, stiff and hard material much resembling natural balata in utility. The benzene polymer solution is prepared by combining 2000 parts by volume of dewatered, deaerated benzene, 72 parts by weight (384 millimoles) of anhydrous titanium chloride, and 37 parts by weight of anhydrous triisobutyl aluminum in a closed, water-jacketed vessel. A dry, $O_2$-free nitrogen atmosphere is maintained at all times during the preparation of the catalyst. The resulting solution warms up and becomes very dark in color. After aging for 30 minutes, and while carefully maintaining the nitrogen atmosphere ($O_2$-free and $H_2O$-free), sufficient additional deaerated, dewatered benzene is added to make a total of 10,000 parts by volume of solvent. While carefully maintaining the nitrogen atmosphere, there is added to the catalyst solution 1083 parts of liquid monomeric butadiene-1,3, the addition being accomplished employing the vapor pressure of the butadiene to force the liquid into the vessel containing the catalyst. Stirring is commenced and heat is applied to the vessel to raise the temperature to about 50° C. and start the reaction. After awhile, cooling water is applied to the vessel in order to maintain a temperature of 50° C. indicating that an exothermic polymerization is proceeding. The benzene solution gradually becomes more viscous as time progresses until after about 17 hours cooling water is no longer required and the pressure drops from 18 inches of mercury to a steady pressure of about 6 inches Hg. At this point the reaction is considered finished. The product is an extremely dark-colored, viscous solution of trans-1,4 polybutadiene in benzene.

The polymer solution is blown with nitrogen pressure into a closed tank having a nitrogen atmosphere and containing 4000 parts by volume of methanol containing 10 parts of phenyl-beta-naphthylamine antioxidant. The benzene-alcohol mixture is vigorously agitated until the polymer has separated out as a solid. The solvent-alcohol mixture is decanted off and the polymer, in the form of a swollen mass, transferred to an open wash mill where the mass is washed and masticated under a constant stream of warm water and finally taken off in sheet form. The polymer is transferred to a dry mill and an additional 10 parts of phenyl-beta-naphthylamine milled into it and the polymer finally sheeted off for drying. The washed and stabilized polymer is dried in a standard vacuum drier to a very low moisture content. The dried polymer is light in color and has a very low ash content.

When compounded in a standard unreinforced balata-type recipe, a strong vulcanizate is obtained. When recovery of the polymer is attempted, by any method, in the presence of air the catalyst residues are difficult to remove (as indicated by high ash contents) and polymer degradation is usually obtained. Moreover, the air-quenched polymer is unpredictable in the vulcanization reaction, it is sometimes highly corrosive and the products vary considerably in physical properties.

*Example III*

An all-cis-1,4 polyisoprene is prepared in a large scale reactor by polymerization in heptane carried out by a procedure similar to that of Example I. The product is a cement (9–10 percent T.S.). The charge (250 pounds) is blown into a 55 gal. metal drum containing 50 pounds of methanol and 0.5 percent by weight on the polymer of an antioxidant known as "BLE" (a reaction product of acetone and diphenylamine). A nitrogen atmosphere is maintained in the drum during the addition of the cement. The drum is then sealed and tumbled to insure mixing of the methanol. The drum is then allowed to stand for 16 to 24 hours to allow separation into cement (heptane) and methanol layers. The latter (at bottom of drum) is drawn off and discarded. The drum is then opened and the cement pumped into an open 500 gal. coagulation tank. Half the weight of the barrel of cement of methanol is then added to the tank with vigorous agitation. The contents of the tank are then allowed to settle and the lower methanol layer discarded. The drum of cement is given two such extractive treatments with methanol in the coagulation tank. Several other barrels of cement prepared in a similar fashion are given three such methanol extractions. The final extracted cements are then each stabilized by the addition of 0.25 percent "BLE," 0.25 percent of ditertiary butyl hydroquinone and 0.5 percent of di-beta-naphthyl-para-phenylenediamine. Portions of the cements are evaporated to dryness in a 50° C. vacuum oven (16–24 hrs.). The dry rubber, in each case, is then mill-massed and stored in polyethylene bags. The ash contents of (1) the polymer after removing the methanol shortstop layer, (2) after the second methanol extraction, (3) after the third methanol extraction and (4) a portion of the original reaction mixtures not treated with methanol are determined to be as follows:

| | Percent |
|---|---|
| (1) | 0.2 |
| (2) | 0.06 |
| (3) | 0.04 |
| (4) (not shortstopped) | >1.0 |

The mill-massed polymer (3) is found to have a 212° F. Mooney viscosity (ML, 4 minutes) of 62. The sol-gel properties (in toluene) of this same polymer are:

| | |
|---|---|
| Intrinsic viscosity | 3.2 |
| Percent gel | 28 |
| Swelling index | 48 |

Polymer No. 3 vulcanizes well in conventional heavy duty carcass and tread rubber recipes indicating efficient removal of catalyst residues. When employed to build heavy duty truck tires, the polymers performed about as good as natural rubber, and evidenced better building tack than natural rubber.

*Example IV*

To demonstrate the effectiveness of alcohol (methanol) as compared to water or acetone as a catalyst shortstop and extracting agent, a fresh catalyst solution is made and equal portions extracted with (1) methanol, (2) water and (3) acetone. The catalyst is made by combining 250 ml. of deaerated, dewatered heptane, 4.93 ml. of trioctyl aluminum and 11 ml. of a 1 molar solution of titanium tetrachloride in heptane to form a dark-colored, precipitate-containing solution. To a one-third (85 ml.) portion of this solution in a closed vessel supplied with a nitrogen atmosphere there is added 100 ml. of methanol with shaking for several minutes after which the mixture is allowed to stand and separate into layers. The methanol layer is withdrawn and set aside. A second 100 ml. portion of methanol is added to the heptane layer with shaking. The latter heptane layer is then separated and evaporated to dryness leaving no detectable residue. A second 85 ml. portion of the catalyst is mixed, as before, with 100 ml. of distilled water. The dark color of the heptane layer gradually changes to a grayish color and a large amount of a white residue collects at the bottom of the container. Similarly, when 100 ml. of acetone are combined with 85 ml. of the catalyst, the color changes from dark brown to white and a white, voluminous and insoluble precipitate forms which is distributed in a single, heptane-acetone phase. It is clear that if water or acetone are added to a freshly-prepared polymerization charge, there is a distinct possibility that the precipitate could be entrapped in, or deposited on, the polymer particles in a solid, insoluble form which would be most difficult to remove.

*Example V*

Solutions of polyisoprene in benzene prepared by procedures similar to those of Examples I and III are handled in such a way that the polymer is air-struck before contacting the alcohol quench solution. In one experiment polymerization is carried out in sealed, nitrogen-filled one quart gingerale bottles to produce a quite viscous benzene polymer solution. The bottles are uncapped and inverted over glass beakers containing methanol or benzene-methanol mixtures. The bottle opening is only an inch or two above the methanol surface. The viscous cement slowly oozes out of the bottle and it is noticed that the surface of the stream changes from brown to tan (whitening action) and apparently forms a tough surface skin. When the polymer is worked in alcohol during extraction, the material of the skin is plainly evident. When the washed and dried polymer is milled, there is a distinct evidence of leathery chips in the otherwise rubbery material.

Likewise a portion of a similar benzene reaction mixture is allowed to stand in air for 4 or 5 days. The surface of the cement acquires a tough, leathery skin about 1½ incres thick which cannot be broken up. When the skin layer is separated and separately macerated, extraced and dried, it is found to consist almost entirely of a highly gelled resinous material which cannot be broken down by milling. Oxygen, therefore, appears to cross link unsaturated polymer containing active-catalyst residue.

*Example VI*

In this example polyethylene is prepared in a 30 gal. reactor having an agitator. The catalyst is prepared by combining, in a sealed flask under a dry, $O_2$-free nitrogen atmosphere, 8.4 pounds of deaerated and redistilled heptane, about 860 millimoles of titanium tetrachloride (11.6 millimoles per liter of heptane solvent in the final reaction mix) and about 422 millimoles of triiosbutyl aluminum (5.85 millimoles/liter). The catalyst is aged at room temperature for 30 minutes and then pressurized with nitrogen into the reactor containing sufficient heptane (at about 48° C.) so as to total about 74 liters. After the catalyst is stirred with the heptane, ethylene gas is bubbled into the solution while maintaining a temperature of about 50° C. After about 5 and ¼ hours of ethylene addition, a thick slurry of polyethylene in heptane (about 10% total solids) is obtained. The charge is blown with nitrogen pressure into a number of five gallon glass demijohns which have been first cleaned, dried and then filled with dry, $O_2$-free nitrogen. In one such demijohn (No. 1) containing 5.2 pounds of ethanol there is delivered 44.8 pounds of slurry; in another (No. 2) containing 6.1 pounds of isopropanol there is delivered 43 pounds of slurry; and in a third (No. 3) empty demijohn there is delivered about 49 pounds of slurry. No effort is made to intermix the ingredients, other than the turbulence caused by slurry delivery.

The demijohns are set aside for several months with periodic withdrawals (by syringe) of small portions of slurry which are treated in various ways to finally work up the polymer in a stable dry form. Each time the ethanol or isopropanol-treated slurries are tested a like portion of the slurry (No. 3) which has not been alcohol treated is used as a comparison. A portion of the #1 (ethanol-killed) bottle is filtered several days after being placed in the bottle and the filter cake vacuum dried without further treatment. Its ash content is found to be 0.4 percent. For purposes of comparison, when a like portion of bottle #3 is filtered and dried, its ash content is found to be about 1.2 percent. It is evident that even the poor contact effected in the five gallon bottles is effective to remove 65 to 70 percent of the inorganic (catalyst) residues in the slurry.

A second portion of bottle #1 is filtered and the filter cake given several successive washes with fresh methanol and then vacuum dried. The ash content of the dried polymer is found to be only 0.03 percent. Likewise, a portion of bottle #2 (isopropanol shortstop) filtered and vacuum dried exhibits an ash content of 0.46 and after several extractions with boiling isopropanol an ash content of only 0.03 percent. The ethanol and isopropanol shortstopped but unextracted polymers molded (3 min. at 400° C. in a closed mold) to a gray color with darker spots and are adjudged to be of only fair to poor quality. The same polymer after extraction with the respective alcohols produced molded specimens which are of commercial color quality. The unquenched polymer (bottle #3) not treated with alcohol in every case produces badly discolored molded specimens which are completely unacceptable for commercial use. Even after standing after several months samples of the polymers of bottles Nos. 1 and 2 could be washed and extracted to form acceptable polymers.

In a similar fashion a sample of a fresh polyethylene-in-heptane slurry similar to that above is placed in a condenser-equipped, nitrogen-filled distillation flask and isopropanol vapor is introduced thereto. An isopropanol-heptane condensate is collected and set aside for separation. Isopropanol vapor is condensed in the flask to form a heptane-isopropanol-polymer slurry. The slurry is filtered and the filter cake is vacuum dried. On molding the dried polymer for 3 minutes at 400° C. the vapor distilled polymer remains essentially color-free, the polymer in this regard being fully equivalent to commercially-available polyethylenes made with non-color forming catalysts. In a similar fashion, steam distillation of a portion of the same alcohol-quenched heptane slurry produces a polymer which does not discolor on molding.

Still another heptane slurry of high molecular weight polyethylene in heptane is discharged from the reactor into a sealed bottle filled with dry nitrogen and then treated first with 1.5 liters of water and then split in equal portions with 1.5 liters of ethanol vapor being added to one such portion and 1.5 liters of liquid ethanol being added to the other. Each slurry is then filtered and reslurried again in ethanol and then filtered and vacuum dried. Both polymer samples developed very bad color on molding. From these and the other above experiments it can be concluded that (1) the alcohol treatment must be carried out in the absence of oxygen, water, etc. and (2) the alcohol treatment must come first before extractive treatments with water, acetone, etc. are applied to it. Apparently the alcohol-inactivated catalysts are less sensitive to oxidation, to hydrolysis or other reactions tending to insolubilize it.

*Example VII*

The previous examples have employed ash contents and molded color as criteria of the effectiveness of catalyst removal. A still more accurate test is the electrical properties of the dried polymers. Even quite small quantities of titanium dioxide (a possible decomposition product of the catalyst residue) added on a rubber mill to a commercially-available polyethylene adversely affects its electrical properties. Most of the alcohol-treated polyethylenes (under $N_2$) of the preceding examples which have been given 2 or 3 alcohol extractions have better electrical properties than the above $TiO_2$-containing commercial polymer.

*Example VIII*

Polymerization reaction mixtures containing polypropylene, polyhexene-1, and polystyrene prepared in heptane or benzene in the presence of catalysts prepared from triisobutyl aluminum and titanium tetrachloride are treated (1) with alcohol in an $O_2$-free nitrogen atmosphere followed by (2) precipitation, filtration and extraction with larger amounts of the same alcohol produce light-colored polymers greatly superior to air-alcohol shortstopped samples of the same polymers.

*Example IX*

Ethylene is polymerized in benzene at 50° C. employing a catalyst made by reacting 8.5 mM./liter of benzene of titanium tetrachloride and sufficient tirisobutyl aluminum to produce a Ti/Al ratio of 0.5:1. Ethylene is passed into the catalyst solution until the latter becomes difficult to stir. At this point about 250 ml. of ethylene glycol for every 500–600 ml. of reaction mix is added to the reaction mixture in the closed reactor under nitrogen and the latter stirred for a few minutes to allow solution to take place. The resulting mixture is then filtered in an open suction filter and the filter cake washed twice with ethylene glycol (1 liter for every 500 ml. of original reaction mix) and finally with an equal volume of methanol. The filter cake is then vacuum dried. The dried polymer is snow white in color and when molded fails to develop discoloration. In like manner, when glycerine is substituted for the ethylene glycol in the above procedure, polyethylene low in color is obtained.

*Example X*

In this example various polyethylene reaction mixtures prepared by polymerization in benzene employing a catalyst made by reacting diisobutyl aluminum chloride and titanium tetrachloride (Ti/Al=C.A. 1:2) and containing 200 to 400 grams of polymer per liter of solvent are treated under nitrogen with 5 to 10 percent by volume of methanol or ethanol. The alcohol-shortstopped slurries are then filtered and dried under vacuum. With this simple treatment snow white polymers are obtained which do not discolor upon molding, injection molding, extruding, mill mixing, etc.

*Example XII*

In a like manner 30 grams of phenol are added under nitrogen to about 50 ml. of reaction mixture containing triisobutyl aluminum/titanium tetrachloride catalyst. The mix is then stirred for a few minutes, the stirrer shut off and the mix allowed to stand overnight under nitrogen. The mix is then filtered and the filter cake washed with three 1500 ml. portions of methanol. After drying the polymer is pure white in color and may be molded to form discs of acceptable color.

I claim:

1. The method of recovering a hydrocarbon polymer from a reaction mix prepared by mixing an olefinic hydrocarbon monomer with a catalyst made by combining, in an inert hydrocarbon solvent, an aluminum alkyl compound with a titanium tetrahalide, said method comprising mixing said reaction mix with 1 to 10% of its volume of an alcohol selected from the class consisting of methanol, ethanol, propanol and isopropanol and agitating the resulting mixture to distribute said alcohol throughout said reaction mixture and allow said catalyst and said alcohol to interact, said step of mixing being carried out prior to any contact of said polymer with the atmosphere and while carefully excluding the said atmosphere, and thereafter separating the said polymer from the said solvent, the said alcohol and the products of the interaction of said catalyst and said alcohol.

2. The method of recovering a light-colored polymer of ethylene from a reaction mix containing said polymer in solid form and prepared by combining a monomeric material containing ethylene with a catalyst made by combining, in an inert hydrocarbon solvent, an aluminum alkyl compound with titanium tetrachloride, said method comprising mixing said reaction mix with 1 to 10% of its volume of an alcohol selected from the class consisting of methanol, ethanol, propanol and isopropanol and agitating the resulting mixture to distribute the said alcohol throughout said reaction mix and allow said catalyst and said alcohol to interact, said steps of mixing and agitating being carried out prior to any contact of said polymer with the atmosphere and while carefully maintaining over the said resulting mixture an atmosphere of inert gas selected from the class consisting of nitrogen, argon, helium and hydrocarbon vapors, and thereafter separating the said polymer from the said solvent, the said alcohol and the products of the interaction of said catalyst with said alcohol.

3. The method as defined in claim 2 further characterized in that the said polymer is polyethylene, the said alcohol is methanol, and the said separating step includes the steps of, first filtering the said polymer from the said resulting mixture and subsequently extracting the said filtered polymer with methanol to remove therefrom further quantities of the said products and convert the said polymer to a form resistant to discoloration on molding at elevated temperatures.

4. The method of recovering a polymer of ethylene from a reaction mix containing said polymer in solid form and an active catalyst, said reaction mix being prepared by mixing monomeric ethylene with a catalyst solution made by combining, in an inert hydrocarbon solvent, an aluminum alkyl compound with titanium tetrachloride, said method comprising mixing said reaction mix with 1 to 10% of its volume of isopropanol and agitating the resulting mixture to distribute the said isopropanol throughout said reaction mix and allow said catalyst and said isopropanol to interact, said steps of mixing and agitating being carried out prior to any contact of said polymer with the atmosphere and while carefully maintaining over the said resulting mixture an atmosphere of inert gas selected from the class consisting of nitrogen, argon, helium, and hydrocarbon vapors, filtering the said polymer from the said solvent, said isopropanol, and the products of the interaction of said catalyst with said isopropanol, and extracting the said separated polymer with isopropanol to remove therefrom further quantities of the said products and convert the said polymer to a form resistant to discoloration on molding at elevated temperatures.

5. The method of recovering a polymer of a conjugated polyolefin containing up to 5 carbon atoms from a reaction mix containing said polymer and an active catalyst, said reaction mix being prepared by mixing said conjugated polyolefin in monomeric form with a catalyst solution made by combining, in an inert hydrocarbon solvent, an aluminum alkyl compound with titanium tetrahalide, said method comprising mixing said reaction mix with 1 to 10% of its volume of an alcohol selected from the class consisting of methanol, ethanol, propanol and isopropanol and agitating the resulting mixture to distribute the said alcohol throughout said reaction mix and allow said catalyst and said alcohol to interact, said steps of mixing and agitating being carried out prior to any contact of said polymer with the atmosphere and while carefully maintaining over the said resulting mixture an atmosphere of inert gas selected from the class consisting of nitrogen, argon, helium and hydrocarbon vapors, and separating the said polymer from the said solvent, said alcohol and the products of the interaction of said catalyst and said alcohol before appreciable degradation of said polymer occurs.

6. The method as defined in claim 5 further characterized by the said polymer being polyisoprene, said titanium tetrahalide being titanium tetrachloride and said alcohol being methanol.

References Cited in the file of this patent

UNITED STATES PATENTS

| | | |
|---|---|---|
| 2,209,746 | Ebert | July 30, 1940 |
| 2,699,457 | Ziegler et al. | Jan. 11, 1955 |
| 2,714,620 | Leary | Aug. 2, 1955 |
| 2,721,189 | Anderson et al. | Oct. 18, 1955 |
| 2,813,136 | Mertz | Nov. 12, 1957 |
| 2,905,645 | Anderson | Sept. 22, 1959 |

FOREIGN PATENTS

| | | |
|---|---|---|
| 534,792 | Belgium | Jan. 31, 1955 |
| 538,782 | Belgium | Dec. 16, 1955 |